(12) United States Patent
Azizi et al.

(10) Patent No.: US 9,867,210 B2
(45) Date of Patent: *Jan. 9, 2018

(54) MASTER STATION AND METHOD FOR HEW COMMUNICATION USING A TRANSMISSION SIGNALING STRUCTURE FOR A HEW SIGNAL FIELD

(71) Applicant: Intel IP Corporation, Santa Clara, CA (US)

(72) Inventors: Shahrnaz Azizi, Cupertino, CA (US); Thomas J. Kenney, Portland, OR (US); Guoqing C. Li, Portland, OR (US); Eldad Perahia, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,782

(22) Filed: Sep. 29, 2016

(65) Prior Publication Data
US 2017/0019916 A1 Jan. 19, 2017

Related U.S. Application Data

(63) Continuation of application No. 14/458,000, filed on Aug. 12, 2014, now Pat. No. 9,544,914.

(Continued)

(51) Int. Cl.
*H04W 4/00* (2009.01)
*H04W 72/12* (2009.01)
(Continued)

(52) U.S. Cl.
CPC ......... *H04W 72/1278* (2013.01); *H04L 5/003* (2013.01); *H04L 27/2601* (2013.01); *H04W 84/12* (2013.01)

(58) Field of Classification Search
CPC .. H04W 72/1278; H04W 84/12; H04L 5/003; H04L 27/2601
See application file for complete search history.

(56) References Cited

U.S. PATENT DOCUMENTS 7,466,964 B2 12/2008 Sondur
7,809,020 B2 10/2010 Douglas et al.
(Continued)

FOREIGN PATENT DOCUMENTS

CN 101433018 A 5/2009
CN 103703711 A 4/2014
(Continued)

OTHER PUBLICATIONS

11ah Preamble for 2Mhz and Beyond, IEEE Submission No. IEEE 802.1-11/1483r2, 1-24.

(Continued)

*Primary Examiner* — Maharishi Khirodhar
(74) *Attorney, Agent, or Firm* — Schwegman Lundberg & Woessner, P.A.

(57) ABSTRACT

Embodiments of a transmission signaling structure for HEW are defined to carry packet information to configure OFDMA receivers for demodulation of a specific portion of the packet and/or to configure receivers for transmission using specific OFDMA and MU-MIMO resources. In some embodiments, the specific portion of the packet comprises one or more minimum bandwidth units of one or more 20 MHz channels. Each 20 MHz bandwidth structure may comprise several minimum bandwidth units to allow each 20 MHz channel to have a have smaller granularity than 20 MHz.

25 Claims, 4 Drawing Sheets

Related U.S. Application Data

(60) Provisional application No. 61/906,059, filed on Nov. 19, 2013, provisional application No. 61/944,194, filed on Feb. 25, 2014, provisional application No. 62/026,277, filed on Jul. 18, 2014, provisional application No. 61/973,376, filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/990,414, filed on May 8, 2014, provisional application No. 61/991,730, filed on May 12, 2014, provisional application No. 62/013,869, filed on Jun. 18, 2014, provisional application No. 62/024,813, filed on Jul. 15, 2014, provisional application No. 62/024,801, filed on Jul. 15, 2014.

(51) Int. Cl.
*H04L 27/26* (2006.01)
*H04L 5/00* (2006.01)
*H04W 84/12* (2009.01)

(56) References Cited

U.S. PATENT DOCUMENTS

| | | |
|---|---|---|
| 8,395,997 B2 | 3/2013 | Banerjea et al. |
| 8,509,323 B2 | 8/2013 | Nangia et al. |
| 8,560,009 B2 | 10/2013 | Etemad |
| 8,948,064 B2 | 2/2015 | Shahar |
| 8,989,158 B2 | 3/2015 | Seok |
| 9,160,503 B2 | 10/2015 | Kim et al. |
| 9,271,241 B2 | 2/2016 | Kenney et al. |
| 9,325,463 B2 | 4/2016 | Azizi et al. |
| 9,450,725 B2 | 9/2016 | Azizi et al. |
| 9,462,504 B2 | 10/2016 | Stephens et al. |
| 9,544,914 B2 * | 1/2017 | Azizi ............... H04W 72/1278 |
| 9,615,291 B2 | 4/2017 | Kenney et al. |
| 9,648,620 B2 | 5/2017 | Tandra |
| 9,680,603 B2 | 6/2017 | Azizi et al. |
| 9,705,643 B2 | 7/2017 | Li et al. |
| 2004/0054820 A1 | 3/2004 | Karaoguz et al. |
| 2004/0146117 A1 | 7/2004 | Subramaniam et al. |
| 2005/0015703 A1 | 1/2005 | Terry et al. |
| 2005/0063336 A1 | 3/2005 | Kim et al. |
| 2005/0135410 A1 | 6/2005 | Stephens |
| 2005/0276347 A1 | 12/2005 | Mujtaba et al. |
| 2006/0018249 A1 | 1/2006 | Shearer et al. |
| 2006/0030322 A1 | 2/2006 | Kim et al. |
| 2006/0062314 A1 | 3/2006 | Palin et al. |
| 2006/0067415 A1 | 3/2006 | Mujtaba |
| 2006/0105764 A1 | 5/2006 | Krishnaswamy et al. |
| 2006/0153060 A1 | 7/2006 | Cho |
| 2007/0014375 A1 | 1/2007 | Nakao |
| 2007/0042715 A1 | 2/2007 | Salo et al. |
| 2007/0060161 A1 | 3/2007 | Chindapol et al. |
| 2007/0147226 A1 | 6/2007 | Khandekar et al. |
| 2007/0147521 A1 | 6/2007 | Horng et al. |
| 2007/0153929 A1 | 7/2007 | Ballentin et al. |
| 2007/0202816 A1 | 8/2007 | Zheng |
| 2007/0207742 A1 | 9/2007 | Kim et al. |
| 2007/0242600 A1 | 10/2007 | Li et al. |
| 2008/0013496 A1 | 1/2008 | Dalmases et al. |
| 2008/0049851 A1 | 2/2008 | Nangia et al. |
| 2008/0188232 A1 | 8/2008 | Park et al. |
| 2008/0232339 A1 | 9/2008 | Yang et al. |
| 2008/0240018 A1 | 10/2008 | Xue et al. |
| 2008/0240275 A1 * | 10/2008 | Cai ....................... H04L 5/0007 375/260 |
| 2009/0007185 A1 | 1/2009 | Nix et al. |
| 2009/0122882 A1 | 5/2009 | Mujtaba |
| 2009/0270109 A1 | 10/2009 | Wang Helmersson et al. |
| 2009/0310692 A1 | 12/2009 | Kafle et al. |
| 2010/0046671 A1 | 2/2010 | Ali et al. |
| 2010/0067480 A1 | 3/2010 | Wang et al. |
| 2010/0080312 A1 | 4/2010 | Moffatt et al. |
| 2010/0091673 A1 | 4/2010 | Sawai et al. |
| 2010/0098181 A1 | 4/2010 | Jacobsen et al. |
| 2010/0107042 A1 | 4/2010 | Sawai et al. |
| 2010/0110804 A1 | 5/2010 | Yeh |
| 2010/0157956 A1 | 6/2010 | Takahashi |
| 2010/0157970 A1 | 6/2010 | Gotman et al. |
| 2010/0172316 A1 | 7/2010 | Hwang et al. |
| 2010/0220678 A1 | 9/2010 | Wentink |
| 2010/0220679 A1 | 9/2010 | Abraham et al. |
| 2010/0246375 A1 | 9/2010 | Orlik et al. |
| 2010/0246539 A1 | 9/2010 | Guillouard et al. |
| 2010/0260159 A1 | 10/2010 | Zhang et al. |
| 2010/0309834 A1 | 12/2010 | Fischer et al. |
| 2010/0322166 A1 | 12/2010 | Sampath et al. |
| 2011/0002219 A1 | 1/2011 | Kim et al. |
| 2011/0013608 A1 | 1/2011 | Lee et al. |
| 2011/0026623 A1 | 2/2011 | Srinivasa et al. |
| 2011/0032850 A1 | 2/2011 | Cai |
| 2011/0038441 A1 | 2/2011 | Shi |
| 2011/0063991 A1 | 3/2011 | Sampath et al. |
| 2011/0075625 A1 | 3/2011 | Nyström et al. |
| 2011/0085513 A1 | 4/2011 | Chen et al. |
| 2011/0096685 A1 | 4/2011 | Lee et al. |
| 2011/0110454 A1 | 5/2011 | Sampath et al. |
| 2011/0116401 A1 | 5/2011 | Banerjea et al. |
| 2011/0149882 A1 | 6/2011 | Gong et al. |
| 2011/0188598 A1 | 8/2011 | Lee et al. |
| 2011/0194544 A1 | 8/2011 | Yang et al. |
| 2011/0206156 A1 | 8/2011 | Lee et al. |
| 2011/0222486 A1 | 9/2011 | Hart |
| 2011/0235593 A1 | 9/2011 | Gong et al. |
| 2011/0243025 A1 | 10/2011 | Kim et al. |
| 2011/0249660 A1 | 10/2011 | Noh et al. |
| 2011/0261708 A1 | 10/2011 | Grandhi |
| 2011/0261769 A1 | 10/2011 | Ji et al. |
| 2011/0268094 A1 | 11/2011 | Gong et al. |
| 2011/0299474 A1 | 12/2011 | Li et al. |
| 2011/0305296 A1 | 12/2011 | Van Nee |
| 2012/0002756 A1 | 1/2012 | Zhang et al. |
| 2012/0063433 A1 | 3/2012 | Wentink |
| 2012/0106481 A1 | 5/2012 | Cho et al. |
| 2012/0127940 A1 | 5/2012 | Lee et al. |
| 2012/0155444 A1 | 6/2012 | Chiueh et al. |
| 2012/0170563 A1 | 7/2012 | Abraham et al. |
| 2012/0201213 A1 | 8/2012 | Banerjea et al. |
| 2012/0218983 A1 | 8/2012 | Noh et al. |
| 2012/0243485 A1 | 9/2012 | Merlin et al. |
| 2012/0269124 A1 | 10/2012 | Porat |
| 2012/0275446 A1 | 11/2012 | Stacey et al. |
| 2012/0314697 A1 | 12/2012 | Noh et al. |
| 2012/0314786 A1 | 12/2012 | Atungsiri et al. |
| 2012/0320890 A1 | 12/2012 | Zhang et al. |
| 2012/0324315 A1 | 12/2012 | Zhang et al. |
| 2012/0327870 A1 | 12/2012 | Grandhi et al. |
| 2012/0327915 A1 | 12/2012 | Kang et al. |
| 2013/0070642 A1 | 3/2013 | Kim et al. |
| 2013/0136075 A1 | 5/2013 | Yu et al. |
| 2013/0142155 A1 | 6/2013 | Trainin et al. |
| 2013/0177090 A1 | 7/2013 | Yang et al. |
| 2013/0188567 A1 | 7/2013 | Wang et al. |
| 2013/0188572 A1 | 7/2013 | Cheong et al. |
| 2013/0229996 A1 | 9/2013 | Wang et al. |
| 2013/0230035 A1 | 9/2013 | Grandhi et al. |
| 2013/0235720 A1 | 9/2013 | Wang et al. |
| 2013/0250940 A1 | 9/2013 | Parlamas |
| 2013/0258975 A1 | 10/2013 | Krishnamurthy et al. |
| 2013/0265907 A1 | 10/2013 | Kim et al. |
| 2013/0286925 A1 | 10/2013 | Fischer et al. |
| 2013/0286959 A1 | 10/2013 | Lou et al. |
| 2013/0301551 A1 | 11/2013 | Ghosh et al. |
| 2013/0301563 A1 | 11/2013 | Gupta et al. |
| 2014/0010196 A1 | 1/2014 | Shapira |
| 2014/0016607 A1 | 1/2014 | Hart |
| 2014/0112274 A1 | 4/2014 | Moon et al. |
| 2014/0169245 A1 | 6/2014 | Kenney et al. |
| 2014/0169356 A1 | 6/2014 | Noh et al. |
| 2014/0211775 A1 | 7/2014 | Sampath et al. |

(56) References Cited

U.S. PATENT DOCUMENTS

| | | | |
|---|---|---|---|
| 2014/0269544 A1 | 9/2014 | Zhu et al. | |
| 2014/0307650 A1 | 10/2014 | Vermani et al. | |
| 2014/0369276 A1 | 12/2014 | Porat et al. | |
| 2015/0023335 A1* | 1/2015 | Vermani | H04B 7/0452 370/338 |
| 2015/0063255 A1* | 3/2015 | Tandra | H04J 11/0023 370/329 |
| 2015/0063318 A1 | 3/2015 | Merlin et al. | |
| 2015/0085836 A1 | 3/2015 | Kang et al. | |
| 2015/0117428 A1 | 4/2015 | Lee et al. | |
| 2015/0124690 A1 | 5/2015 | Merlin et al. | |
| 2015/0124745 A1* | 5/2015 | Tandra | H04B 7/0452 370/329 |
| 2015/0131517 A1 | 5/2015 | Chu et al. | |
| 2015/0131756 A1 | 5/2015 | Suh et al. | |
| 2015/0139090 A1 | 5/2015 | Stephens et al. | |
| 2015/0139091 A1 | 5/2015 | Azizi et al. | |
| 2015/0139118 A1 | 5/2015 | Azizi et al. | |
| 2015/0139119 A1 | 5/2015 | Azizi et al. | |
| 2015/0139205 A1 | 5/2015 | Kenney et al. | |
| 2015/0139206 A1 | 5/2015 | Azizi et al. | |
| 2015/0146808 A1 | 5/2015 | Chu et al. | |
| 2015/0207599 A1 | 7/2015 | Kim et al. | |
| 2015/0208394 A1 | 7/2015 | Seo et al. | |
| 2015/0237531 A1 | 8/2015 | Hao et al. | |
| 2015/0288489 A1 | 10/2015 | Azizi et al. | |
| 2015/0327121 A1 | 11/2015 | Li et al. | |
| 2016/0020885 A1 | 1/2016 | Li et al. | |
| 2016/0112899 A1 | 4/2016 | Kenney et al. | |
| 2016/0211944 A1 | 7/2016 | Kenney et al. | |
| 2016/0211961 A1 | 7/2016 | Azizi et al. | |
| 2016/0227572 A1 | 8/2016 | Li et al. | |
| 2016/0241366 A1 | 8/2016 | Azizi et al. | |
| 2016/0242173 A1 | 8/2016 | Li et al. | |
| 2016/0344531 A1 | 11/2016 | Li et al. | |
| 2017/0005709 A1 | 1/2017 | Li et al. | |
| 2017/0111154 A1* | 4/2017 | Azizi | H04L 5/0053 |
| 2017/0135035 A1 | 5/2017 | Azizi et al. | |
| 2017/0201359 A1 | 7/2017 | Li et al. | |

FOREIGN PATENT DOCUMENTS

| | | |
|---|---|---|
| CN | 105379217 A | 3/2016 |
| CN | 105637968 A | 6/2016 |
| CN | 105659656 A | 6/2016 |
| CN | 105659681 A | 6/2016 |
| CN | 105706407 A | 6/2016 |
| CN | 105900511 A | 8/2016 |
| CN | 105917611 A | 8/2016 |
| CN | 105917730 A | 8/2016 |
| CN | 106100807 A | 11/2016 |
| CN | 106105080 A | 11/2016 |
| CN | 106464634 A | 2/2017 |
| CN | 106464638 A | 2/2017 |
| CN | 106464652 A | 2/2017 |
| CN | 106465360 A | 2/2017 |
| CN | 106899385 A | 6/2017 |
| EP | 2362580 A2 | 8/2011 |
| EP | 2499872 A1 | 9/2012 |
| EP | 3072254 A1 | 9/2016 |
| EP | 3072255 A1 | 9/2016 |
| EP | 3072270 A1 | 9/2016 |
| EP | 3072324 A1 | 9/2016 |
| EP | 3072344 A1 | 9/2016 |
| EP | 3072345 A1 | 9/2016 |
| EP | 3072347 A1 | 9/2016 |
| JP | 2007074689 A | 3/2007 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201234880 A | 8/2012 |
| TW | 201251382 A | 12/2012 |
| TW | 201301827 A | 1/2013 |
| TW | 201306533 A | 2/2013 |
| TW | 201322786 A | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201538023 A | 10/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201605191 A | 2/2016 |
| TW | 201605271 A | 2/2016 |
| TW | 201608863 A | 3/2016 |
| TW | 201622458 A | 6/2016 |
| TW | 201632022 A | 9/2016 |
| TW | I572160 B | 2/2017 |
| TW | I572173 B | 2/2017 |
| TW | I573413 B | 3/2017 |
| TW | I578733 B | 4/2017 |
| TW | I578837 B | 4/2017 |
| TW | I578838 B | 4/2017 |
| WO | WO-2005053198 A2 | 6/2005 |
| WO | WO-2008118429 A1 | 10/2008 |
| WO | WO-2010118383 A1 | 10/2010 |
| WO | WO-2011025146 A2 | 3/2011 |
| WO | WO-2011068387 A2 | 6/2011 |
| WO | WO-2011153507 A2 | 12/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2013191609 A1 | 12/2013 |
| WO | WO-2014066785 A1 | 5/2014 |
| WO | WO-2015031323 A1 | 3/2015 |
| WO | WO-2015076917 A1 | 5/2015 |
| WO | WO 2015076923 A1 | 5/2015 |
| WO | WO-2015076932 A1 | 5/2015 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015127777 A1 | 9/2015 |
| WO | WO-2015130335 A1 | 9/2015 |
| WO | WO-2015130341 A1 | 9/2015 |
| WO | WO-2015171243 A1 | 11/2015 |
| WO | WO-2015195460 A1 | 12/2015 |
| WO | WO-2016010578 A1 | 1/2016 |
| WO | WO-2016010651 A1 | 1/2016 |

OTHER PUBLICATIONS

"(Discussion on potential techniques for HEW", IEEE 802.11-13/0871 rO), (Jul. 15, 2013), 13 pgs.

"11ah Preamble for 2Mhz and Beyond", IEEE Submission No. IEEE 802.1-11/1483r2, 1-24.

"U.S. Appl. No. 14/304,041, Notice of Allowance dated Oct. 8, 2015", 8 pgs.

"U.S. Appl. No. 14/304,041, Supplemental Notice of Allowability dated Nov. 4, 2015", 5 pgs.

"U.S. Appl. No. 14/315,562, Examiner Interview Summary dated Jun. 20, 2016", 2 pgs.

"U.S. Appl. No. 14/315,562, Final Office Action dated Mar. 21, 2016", 16 pgs.

"U.S. Appl. No. 14/315,562, Non Final Office Action dated Sep. 25, 2015", 14 pgs.

"U.S. Appl. No. 14/315,562, Notice of Allowability dated Jun. 20, 2016", 7 pgs.

(56) References Cited

OTHER PUBLICATIONS

"U.S. Appl. No. 14/315,562, Notice of Allowance dated Jun. 6, 2016", 12 pgs.
"U.S. Appl. No. 14/315,562, Response filed May 16, 2016 to Final Office Action dated Mar. 21, 2016", 10 pgs.
"U.S. Appl. No. 14/315,562, Response filed Dec. 28, 2015 to Non Final Office Action dated Sep. 25, 2015", 9 pgs.
"U.S. Appl. No. 14/338,137, Corrected Notice of Allowance dated Jan. 22, 2016", 10 pgs.
"U.S. Appl. No. 14/338,137, Notice of Allowance dated Nov. 25, 2015", 14 pgs.
"U.S. Appl. No. 14/447,254, Examiner Interview Summary dated Jun. 22, 2016", 4 pgs.
"U.S. Appl. No. 14/447,254, Final Office Action dated Sep. 14, 2016", 13 pgs.
"U.S. Appl. No. 14/447,254, Non Final Office Action dated Mar. 31, 2016", 13 pgs.
"U.S. Appl. No. 14/447,254, Response filed Aug. 1, 2016 to Non Final Office Action dated Mar. 31, 2016", 12 pgs.
"U.S. Appl. No. 14/458,000, Final Office Action dated May 9, 2016", 1 pgs.
"U.S. Appl. No. 14/458,000, Non Final Office Action dated Dec. 3, 2015", 16 pgs.
"U.S. Appl. No. 14/458,000, Notice of Allowance dated Aug. 24, 2016", 11 pgs.
"U.S. Appl. No. 14/458,000, Response filed Mar. 3, 2015 to Non Final Office Action dated Dec. 3, 2015", 15 pgs.
"U.S. Appl. No. 14/458,000, Response filed Aug. 8, 2016 to Final Office Action dated May 9, 2016", 12 pgs.
"U.S. Appl. No. 14/459,385, Response filed May 4, 2016 to Non Final Office Action dated Jan. 14, 2016", 9 pgs.
"U.S. Appl. No. 14/498,385, Final Office Action dated Aug. 11, 2016", 20 pgs.
"U.S. Appl. No. 14/498,385, Non Final Office Action dated Jan. 14, 2016", 19 pgs.
"U.S. Appl. No. 14/563,406, Examiner Interview Summary dated Jul. 26, 2016", 3 pgs.
"U.S. Appl. No. 14/563,406, Final Office Action dated Aug. 9, 2016", 15 pgs.
"U.S. Appl. No. 14/563,406, Non Final Office Action dated Apr. 26, 2016", 12 pgs.
"U.S. Appl. No. 14/563,406, Response filed Jul. 26, 2016 to Non Final Office Action dated Apr. 26, 2016", 9 pgs.
"U.S. Appl. No. 14/573,912, Non Final Office Action dated Jun. 16, 2016", 7 pgs.
"U.S. Appl. No. 14/977,405, Examiner Interview Summary dated Jul. 25, 2016", 3 pgs.
"U.S. Appl. No. 14/977,405, Final Office Action dated Aug. 24, 2016", 8 pgs.
"U.S. Appl. No. 14/977,405, Non Final Office Action dated Feb. 26, 2016", 7 pgs.
"U.S. Appl. No. 14/977,405, Preliminary Amendment filed Dec. 22, 2015", 11 pgs.
"U.S. Appl. No. 14/977,405, Response filed Jul. 20, 2016 to Non Final Office Action dated Feb. 26, 2016", 11 pgs.
"U.S. Appl. No. 15/052,600, Corrected Notice of Allowance dated Jun. 24, 2016", 7 pgs.
"U.S. Appl. No. 15/052,600, Corrected Notice of Allowance dated Aug. 5, 2016", 7 pgs.
"U.S. Appl. No. 15/052,600, Notice of Allowance dated May 20, 2016", 10 pgs.
"U.S. Appl. No. 15/052,600, Preliminary Amendment filed Apr. 1, 2016", 10 pgs.
"European Application Serial No. 16168650.6, Extended European Search Report dated Sep. 7, 2016", 12 pgs.
"Guard interval estimation considering switch time and propagation delay", R1-134362, 3GPP TSG RAN WG1 Meeting #74bis, (Oct. 2013).
"Indian Application Serial No. 201647013626, Voluntary Amendment filed Aug. 4, 2016", 15 pgs.
"International Application Serial No. PCT/CN2014/086532, International Search Report dated Dec. 17, 2014", 4 pgs.
"International Application Serial No. PCT/CN2014/086532, Written Opinion dated Dec. 17, 2014", 4 pgs.
"International Application Serial No. PCT/US2014/044881, International Preliminary Report on Patentability dated Sep. 9, 2016", 9 pgs.
"International Application Serial No. PCT/US2014/044881, International Search Report dated Nov. 24, 2014", 3 pgs.
"International Application Serial No. PCT/US2014/044881, Written Opinion dated Nov. 24, 2014", 7 pgs.
"International Application Serial No. PCT/US2014/053451, International Preliminary Report on Patentability dated Sep. 9, 2016", 6 pgs.
"International Application Serial No. PCT/US2014/053451, International Search Report dated Dec. 10, 2014", 3 pgs.
"International Application Serial No. PCT/US2014/053451, Written Opinion dated Dec. 10, 2014", 4 pgs.
"International Application Serial No. PCT/US2014/055996, International Preliminary Report on Patentability dated Jun. 2, 2016", 7 pgs.
"International Application Serial No. PCT/US2014/055996, International Search Report dated Dec. 17, 2014", 3 pgs.
"International Application Serial No. PCT/US2014/055996, Written Opinion dated Dec. 17, 2014", 5 pgs.
"International Application Serial No. PCT/US2014/056819, International Preliminary Report on Patentability dated Jun. 2, 2016", 8 pgs.
"International Application Serial No. PCT/US2014/056819, International Search Report dated Dec. 31, 2014", 3 pgs.
"International Application Serial No. PCT/US2014/056819, Written Opinion dated Dec. 31, 2014", 6 Pgs.
"International Application Serial No. PCT/US2014/057751, International Preliminary Report on Patentability dated Jun. 2, 2016", 7 pgs.
"International Application Serial No. PCT/US2014/057751, International Search Report dated Jan. 5, 2015", 3 pgs.
"International Application Serial No. PCT/US2014/057751, Written Opinion dated Jan. 5, 2015", 5 pgs.
"International Application Serial No. PCT/US2014/064340, International Preliminary Report on Patentability dated Jun. 2, 2016", 8 pgs.
"International Application Serial No. PCT/US2014/064340, International Search Report dated Feb. 16, 2015", 3 pgs.
"International Application Serial No. PCT/US2014/064340, Written Opinion dated Feb. 16, 2015", 6 pgs.
"International Application Serial No. PCT/US2014/064350, International Preliminary Report on Patentability dated Jun. 2, 2016", 7 pgs.
"International Application Serial No. PCT/US2014/064350, International Search Report dated Feb. 6, 2015", 4 pgs.
"International Application Serial No. PCT/US2014/064350, Written Opinion dated Feb. 6, 2015", 5 pgs.
"International Application Serial No. PCT/US2014/064509, International Preliminary Report on Patentability dated Jun. 2, 2016", 10 pgs.
"International Application Serial No. PCT/US2014/064509, International Search Report dated Feb. 11, 2015", 3 pgs.
"International Application Serial No. PCT/US2014/064509, Written Opinion dated Feb. 11, 2015", 8 pgs.
"International Application Serial No. PCT/US2014/064599, International Preliminary Report on Patentability dated Jun. 2, 2016", 9 pgs.
"International Application Serial No. PCT/US2014/064599, International Search Report dated Feb. 26, 2015", 3 pgs.
"International Application Serial No. PCT/US2014/064599, Written Opinion dated Feb. 26, 2015", 7 pgs.
"International Application Serial No. PCT/US2014/064767, International Preliminary Report on Patentability dated Jun. 2, 2016", 10 pgs.
"International Application Serial No. PCT/US2014/064767, International Search Report dated Feb. 26, 2015", 8 pgs.

(56) References Cited

OTHER PUBLICATIONS

"International Application Serial No. PCT/US2014/064767, Written Opinion dated Feb. 26, 2015", 8 pgs.
"International Application Serial No. PCT/US2014/065166, International Preliminary Report on Patentability dated Jun. 2, 2016", 8 pgs.
"International Application Serial No. PCT/US2014/065166, International Search Report dated Jan. 22, 2015", 3 pgs.
"International Application Serial No. PCT/US2014/065166, Written Opinion dated Jan. 22, 2015", 6 pgs.
"International Application Serial No. PCT/US2014/066133, International Preliminary Report on Patentability dated Jun. 2, 2016", 9 pgs.
"International Application Serial No. PCT/US2014/066133, International Search Report dated Feb. 24, 2015", 3 pgs.
"International Application Serial No. PCT/US2014/066133, Written Opinion dated Feb. 24, 2015", 7 pgs.
"International Application Serial No. PCT/US2014/071942, International Search Report dated Apr. 17, 2015", 3 pgs.
"International Application Serial No. PCT/US2014/071942, Written Opinion dated Apr. 17, 2015", 7 pgs.
"International Application Serial No. PCT/US2015/024889, International Search Report dated Jun. 29, 2015", 3 pgs.
"International Application Serial No. PCT/US2015/024889, Written Opinion dated Jun. 29, 2015", 11pgs.
"International Application Serial No. PCT/US2015/035114, International Search Report dated Oct. 19, 2015", 3 pgs.
"International Application Serial No. PCT/US2015/035114, Written Opinion dated Oct. 19, 2015", 8 pgs.
"International Application Serial No. PCT/US2015/035313, International Search Report dated Sep. 25, 2015", 4 pgs.
"International Application Serial No. PCT/US2015/035313, Written Opinion dated Sep. 25, 2015", 8 pgs.
"Taiwanese Application Serial No. 104101656, Office Action dated Mar. 21, 2016", 7 pgs.
"Taiwanese Application Serial No. 104101789, Office Action dated Mar. 25, 2016", w/ English Claims, 18 pgs.
"Taiwanese Application Serial No. 104101790, Office Action dated Apr. 21, 2016", w/ English Claims, 12 pgs.
"Taiwanese Application Serial No. 104106272, Office Action dated Apr. 18, 2016", w/ English Claims, 15 pgs.
"Taiwanese Application Serial No. 104106275, Office Action dated Jun. 8, 2016", 3 pgs.
"Taiwanese Application Serial No. 104108803, Office Action dated Jul. 1, 2016", 4 pgs.
"Taiwanese Application Serial No. 104108807, Office Action dated May 26, 2016", W / English Search Report, 10 pgs.
"Taiwanese Application Serial No. 104110914, Office Action dated Mar. 28, 2016", w/ English Claims, 14 pgs.
"Taiwanese Application Serial No. 104113863, Office Action dated Jun. 6, 2016", 5 pgs.
"Taiwanese Application Serial No. 104117983, Office Action dated Jul. 28, 2016", 5 pgs.
"Taiwanese Application Serial No. 104118504, Office Action dated Jul. 21, 2016" 12 pgs.
"Taiwanese Application Serial No. 105113980, Office Action dated Jul. 21, 2016", 4 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo "Discussion on OFDMA in HEW", In: IEEE P802.11—High Efficiency WLAN Study Group, (Nov. 11, 2013), 11 pgs.
Chun, Jinyoung, et al., "Legacy Support on HEW frame structure", IEEE 11-13/1057r0, (Sep. 1, 2013), 8 pgs.
Chun, Jinyoung, et al., "Uplink multi-user transmission", In: IEEE P802.11—High Efficiency WLAN Study Group, (Nov. 11, 2013), 18 pgs.
Hiertz, Guido R, et al., "Proposed direction and priorities for HEW", In: IEEE P802.11—High Efficiency WLAN Study Group, (Nov. 12, 2013), 17 pgs.
Katsuo, Yunoki, et al., "Access Control Enhancement", doc.:IEEE II-13/1073r1, [Online]. Retrieved from the Internet: <https://mentor.ieee.org/802.11/documents?is_dcn=1073>, (Sep. 18, 2013), 1-9.
Koskela, Timo, et al., "Discussion on Potential Techniques for HEW", In: IEEE P802.11—High Efficiency WLAN Study Group, [Online] Retrieved from the Internet : <http://www.ieee802.org/11/Reports/hew_update.html>, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
"U.S. Appl. No. 14/341,055, Non Final Office Action dated Nov. 14, 2016", 10 pgs.
"U.S. Appl. No. 14/563,406, Response filed Jan. 9, 2017 to Final Office Action dated Aug. 9, 2016", 9 pgs.
"U.S. Appl. No. 14/573,912, Notice of Allowability dated Dec. 9, 2016", 2 pgs.
"U.S. Appl. No. 14/573,912, Notice of Allowance dated Nov. 3, 2016", 7 pgs.
"U.S. Appl. No. 14/573,912, Response filed Oct. 17, 2016 to Non Final Office Action dated Jun. 16, 2016", 11 pgs.
"U.S. Appl. No. 14/977,405, Notice of Allowance dated Nov. 18, 2016", 8 pgs.
"U.S. Appl. No. 14/977,405, Response filed Oct. 24, 2016 to Final Office Action dated Aug. 24, 2016", 11 pgs.
"European Application Serial No. 14863362.1, Response filed Dec. 20, 2016 to Communication pursuant to Rules 161(2) and 162 EPC dated Jun. 28, 2016", 21 pgs.
"European Application Serial No. 14864664.9, Response filed Dec. 22, 2016 to Communication pursuant to Rules 161(2) and 162 EPC dated Jun. 28, 2016", 4 pgs.
"European Application Serial No. 14883772.7, Communication of European publication number and information on the application of Article 67(3) dated Dec. 7, 2016", 1 pg.
"Indian Application Serial No. 201647013653, Preliminary Amendment filed Aug. 8, 2016", W/ English Translation, 18 pgs.
"International Application Serial No. PCT/US2015/024889, International Preliminary Report on Patentability dated Nov. 17, 2016", 13 pgs.
"Taiwanese Application Serial No. 104101789, Response filed Sep. 23, 2016 to Office Action dated Mar. 25, 2016", W/ English Translation of Claims, 61 pgs.
"Taiwanese Application Serial No. 104101790, Response filed Jul. 22, 2016 to Office Action dated Apr. 21, 2016", W/ English Claims, 10 pgs.
"Taiwanese Application Serial No. 104106272, Response filed Oct. 14, 2016 to Office Action dated Apr. 18, 2016", W/ English Claims, 45 pgs.
"Taiwanese Application Serial No. 104106275, Response filed Sep. 6, 2016 to Office Action dated Jun. 8, 2016", W/ English Claims, 80 pgs.
"Taiwanese Application Serial No. 104108807, Response filed Nov. 25, 2016 Office Action dated May 26, 2016", W/ English Claims, 65 pgs.
"Taiwanese Application Serial No. 104110914, Response filed Sep. 10, 2016 to Office Action dated Mar. 28, 2016", W/ English Translation of Claims, 98 pgs.
"Taiwanese Application Serial No. 104113863, Response filed Aug. 30, 2016 to Office Action dated Jun. 6, 2016", W/ English Claims, 76 pgs.
"Taiwanese Application Serial No. 104118504, Response filed Oct. 18, 2016 to Office Action dated Jul. 21, 2016", W/ English Claims, 104 pgs.
"Taiwanese Application Serial No. 104122567, Office Action dated Oct. 13, 2016", W/ English Search Report, 8 pgs.
"Taiwanese Application Serial No. 105113980, Response filed Oct. 24, 2016 to Office Action dated Jul. 21, 2016", W/ English Claims, 80 pgs.
"U.S. Appl. No. 14/341,055, Examiner Interview Summary dated Apr. 18, 2017", 3 pgs.

(56) References Cited

OTHER PUBLICATIONS

"U.S. Appl. No. 14/341,055, Response filed Apr. 14, 2017 to Non Final Office Action dated Nov. 14, 2016", 11 pgs.
"U.S. Appl. No. 14/447,254, Advisory Action dated Feb. 13, 2017", 4 pgs.
"U.S. Appl. No. 14/447,254, Examiner Interview Summary dated Jan. 18, 2017", 3 pgs.
"U.S. Appl. No. 14/447,254, Response filed Jan. 17, 2017 Final Office Action dated Sep. 14, 2016", 11 pgs.
"U.S. Appl. No. 14/498,385, Examiner Interview Summary dated Jan. 20, 2017", 3 pgs.
"U.S. Appl. No. 14/498,385, Non Final Office Action dated Mar. 9, 2017", 12 pgs.
"U.S. Appl. No. 14/498,385, Response filed Feb. 13, 2017 to Final Office Action dated Aug. 11, 2016", 9 pgs.
"U.S. Appl. No. 14/498,385, Response filed Jul. 10, 2017 to Non Final Office Action dated Mar. 9, 2017", 8 pgs.
"U.S. Appl. No. 14/563,406, Advisory Action dated Jan. 23, 2017", 3 pgs.
"U.S. Appl. No. 14/563,406, Corrected Notice of Allowance dated Jun. 14, 2017", 2 pgs.
"U.S. Appl. No. 14/563,406, Examiner Interview Summary dated Jan. 18, 2017", 3 pgs.
"U.S. Appl. No. 14/563,406, Notice of Allowance dated Mar. 7, 2017", 7 pgs.
"U.S. Appl. No. 14/573,912, Notice of Allowability dated Jan. 13, 2017", 4 pgs.
"U.S. Appl. No. 14/573,912, Notice of Allowability dated May 11, 2017", 2 pgs.
"U.S. Appl. No. 15/023,262, Non Final Office Action dated Jul. 11, 2017", 14 pgs.
"U.S. Appl. No. 15/023,581, Non Final Office Action dated Jan. 17, 2017", 10 pgs.
"U.S. Appl. No. 15/023,581, Preliminary Amendment filed Mar. 21, 2016", 3 pgs.
"U.S. Appl. No. 15/023,581, Response filed Apr. 11, 2017 to Non Final Office Action dated Jan. 17, 2017", 15 pgs.
"U.S. Appl. No. 15/026,022, Non Final Office Action dated Jul. 18, 2017", 7 pgs.
"U.S. Appl. No. 15/026,022, Preliminary Amendment dated Mar. 30, 2016", 9 pgs.
"U.S. Appl. No. 15/263,864, Non Final Office Action dated Mar. 10, 2017", 4 pgs.
"U.S. Appl. No. 15/263,864, Response filed Jun. 9, 2017 to Non Final Office Action dated Mar. 10, 2017", 9 pgs.
"U.S. Appl. No. 15/394,069, Non Final Office Action dated May 26, 2017", 18 pgs.
"Chinese Application Serial No. 201580079973.7, Voluntary Amendment filed on Jun. 15, 2017", (W/ English Translation), 12 pgs.
"European Application Serial No. 14863133.6, Extended European Search Report dated Jul. 3, 2017", 10 pgs.
"European Application Serial No. 14863142.7, Extended European Search Report dated May 3, 2017", 7 pgs.
"European Application Serial No. 14863362.1, Extended European Search Report dated Jul. 18, 2017", 8 pgs.
"European Application Serial No. 14864636.7, Extended European Search Report dated Jul. 21, 2017", 8 pgs.
"European Application Serial No. 14864680.5, Extended European Search Report dated Jul. 18, 2017", 11 pgs.
"European Application Serial No. 17153414.2, Extended European Search Report dated May 3, 2017", 8 pgs.
"Further evaluation on outdoor Wi-Fi ; 11-13-0843-00-0hew-further-evaluation-on-outdoor-wi-fi", W00kbong Lee (LG Electronics): IEEE SA Mentor; 11-13-0843-00-0hew-further-evaluation-on-outdoor-wi-fi, IEEE—SA Mentor, Piscataway, NJ USA, (Jul. 15, 2013), 18 pgs.
"HEW SG PHY Considerations for Outdoor Environment; 11-13-0536-00-0hew-hew-sg-phy-considerations-for-outdoor-environment", W00kbong Lee (LG Electronics): IEEE SA Mentor; 11-13-0536-00-0hew-hew-sg-phy-considerations-for-outdoor-environment, IEEE—Samentor, Piscataway, NJ USA,, (May 13, 2013), 21 pgs.
"Indian Application Serial No. 201647013652, Preliminary Amendment dated Aug. 4, 2016", 11 pgs.
"Indian Application Serial No. 201647039642, Preliminary Amendment filed Jan. 5, 2017", 5 pgs.
"International Application Serial No. PCT/US2014/071942, International Preliminary Report on Patentability dated Feb. 2, 2017", 9 pgs.
"International Application Serial No. PCT/US2015/035114, International Preliminary Report on Patentability dated Jan. 26, 2017", 10 pgs.
"Taiwanese Application Serial No. 104108803, Response filed Jan. 3, 2017 to Office Action dated Jul. 1, 2016", w/English Claims, 8 pgs.
"Taiwanese Application Serial No. 104117983, Response filed Jan. 16, 2017 to Office Action dated Jul. 28, 2016", (W/ English Translation), 87 pgs.
"Taiwanese Application Serial No. 104118345, Office Action dated May 10, 2017", W/ English Translation, 9 pgs.
"Taiwanese Application Serial No. 104118504, Office Action dated Apr. 21, 2017", W/English Claims, 19 pgs.
"Taiwanese Application Serial No. 104122567, Office Action dated Jun. 27, 2017", (W/ Partial English Translation), 5 pgs.
"Taiwanese Application Serial No. 104122567, Response Filed Apr. 13, 2017 to Office Action dated Oct. 13, 2016", (W/O English Claims), 9 pgs.
Jianhan, Liu, "Summary and Discussions of Proposals on Potential PHY Technologies in HEW 11-13-1375-01-0hew-summary-and-discussions-of-proposals-on-potential-phy-technologies-in-hew", IEEE Draft; 11-13-1375-01-0hew-summary-and-discussions-of-proposals-on-potential-phy-technologies-in-hew, IEEE—SA Mentor, Piscataway, NJ USA, vol. 802.11 HEW, No. 1,, (Nov. 12, 2013), 1-15.
Jinsoo, Choi, "Discussion on OFDMA in HEW ; 11-13-1382-00-0hew-di scussion-on-ofdma-inhew", (LG Electronics): IEEE Draft; 11-13-1382-00-0hew-discussion-0n-0fdma-in-hew, IEEE—SA Mentor, Piscataway, NJ USA vol. 802.11 HEW, (Nov. 12, 2013), 1-11.
Raja, Banerjea, "A simplified STR Mechansim—MAC 11-14-0340-00-0hew-a-simplified-str-mechansim mac", IEEE Draft, 11-14-0340-00-Ohew-a-simplified-str-mechansim-mac, IEEE—Samentor, Piscataway, NJ USA, vol. 802.11HEW, (Mar. 16, 2014), 13 pgs.
Robert, Stacey, "Proposed Specification Framework for TGac; 11-09-0992-21-00ac-proposed-specification-framework for tgac", IEEE SA Mentor, 11-09-0992-21-00ac-proposed-specificationframework-for-tgac,IEEE—Samentor, Piscataway, NJ USA, vol. 802.11ac,No. 21, (Jan. 19, 2011), 49 pgs.
Robert, Stacey, "Proposed TGac Draft Amendment ; 11-10-1361-13-00ac-proposed-tgac-draft-amendment", IEEE SA Mentor;11-1O-1361-O3-00ac-proposed-tgac-draft-amendment, IEEE—SA Mentor, Piscataway, NJUSA,, (Jan. 19, 2011), 154 pgs.
"U.S. Appl. No. 14/341,055, Notice of Allowance dated Jul. 25, 2017", 10 pgs.
"U.S. Appl. No. 14/498,385, Examiner Interview Summary dated Aug. 2, 2017", 3 pgs.
"U.S. Appl. No. 15/023,581, Notice of Allowance dated Jul. 27, 2017", 8 pgs.
"U.S. Appl. No. 15/113,214, Restriction Requirement dated Aug. 10, 2017", 6 pgs.
"Chinese Application Serial No. 201580025791.6, Voluntary Amendment filed on Jun. 21, 2017", (W/ English Claims), 16 pgs.
"European Application No. 14864664.9, Extended European Search Report dated Aug. 14, 2017", 6 pgs.
"European Application Serial No. 14864107.9, Extended European Search Report dated Jul. 27, 2017", 13 pgs.
"Taiwanese Application Serial No. 104118504, Response Filed Jul. 20, 2017 to Office Action dated Apr. 21, 2017", without English Translation, 8 pgs.
Dave, Hedberg, et al., "Adjacent Channel Interference and Filtering for 56-carrier Signals ;11-04-1579-01-000n-11-04-1579-00-000n-aci-results", (Jan. 17, 2005), 1-26 pgs.

(56) References Cited

OTHER PUBLICATIONS

Jinyoung, Chun, et al., "Legacy Support on HEW frame structure", IEEE Draft; 11-13-1057-00-0hew-legacy-support-on-hew-frame-structure, IEEE—SA Mentor, Piscataway NJ USA, vol. 802.11 HEW, (Sep. 16, 2013), 1-8.

Sean, Coffey, et al., "WWiSE complete proposal :presentation ; 11-04-0935-04-000n-wwise-complete-proposal presentation", 66 pgs.

"European Application Serial No. 14883581.2, Extended European Search Report dated Sep. 29, 2017", 9 pgs.

"European Application Serial No. 14883772.7, Extended European Search Report dated Oct. 12, 2017", 7 pgs.

"European Application Serial No. 16168650.6, Communication Pursuant to Article 94(3) EPC dated Aug. 2, 2017", 5 pgs.

"U.S. Appl. No. 15/023,262, Examiner Interview Summary dated Oct. 11, 2017", 3 pgs.

"U.S. Appl. No. 15/023,262, Response filed Oct. 10, 2017 to Non Final Office Action dated Jul. 11, 2017", 11 pgs.

"U.S. Appl. No. 15/026,022, Examiner Interview Summary dated Sep. 7, 2017", 3 pgs.

"U.S. Appl. No. 15/026,022, Notice of Allowance dated Oct. 11, 2017", 5 pgs.

"U.S. Appl. No. 15/026,022, Response filed Sep. 7, 2017 to Non Final Office Action dated Jul. 18, 2017", 9 pgs.

"U.S. Appl. No. 15/113,214, Response filed Oct. 6, 2017 to Restriction Requirement dated Aug. 10, 2017", 9 pgs.

"U.S. Appl. No. 15/263,864, Final Office Action dated Sep. 21, 2017", 19 pgs.

"U.S. Appl. No. 15/263,864, Response Filed Oct. 18, 2017 to Final Office Action dated Sep. 21, 2017", 11 pgs.

"U.S. Appl. No. 15/394,069, Examiner Interview Summary dated Jul. 28, 2017", 3 pgs.

"U.S. Appl. No. 15/394,069, Notice of Allowance dated Sep. 22, 2017", 8 pgs.

"U.S. Appl. No. 15/394,069, Response filed Aug. 23, 2017 to Non Final Office Action dated May 26, 2017", 12 pgs.

"U.S. Appl. No. 15/644,937, Preliminary Amendment filed Aug. 30, 2017", 8 pgs.

"IEEE Standard 802.11b-1999", (1999), 1-89.

\* cited by examiner

- PRIOR ART -

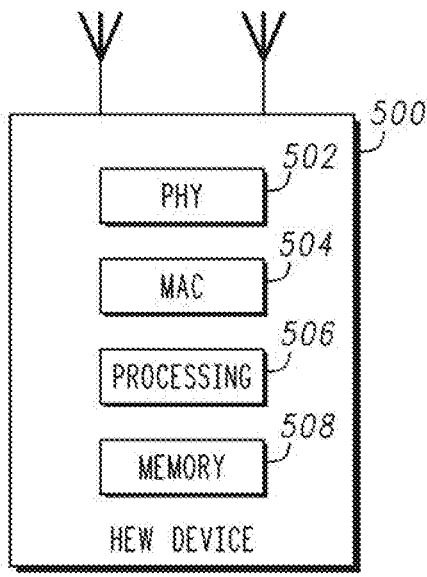
FIG. 5
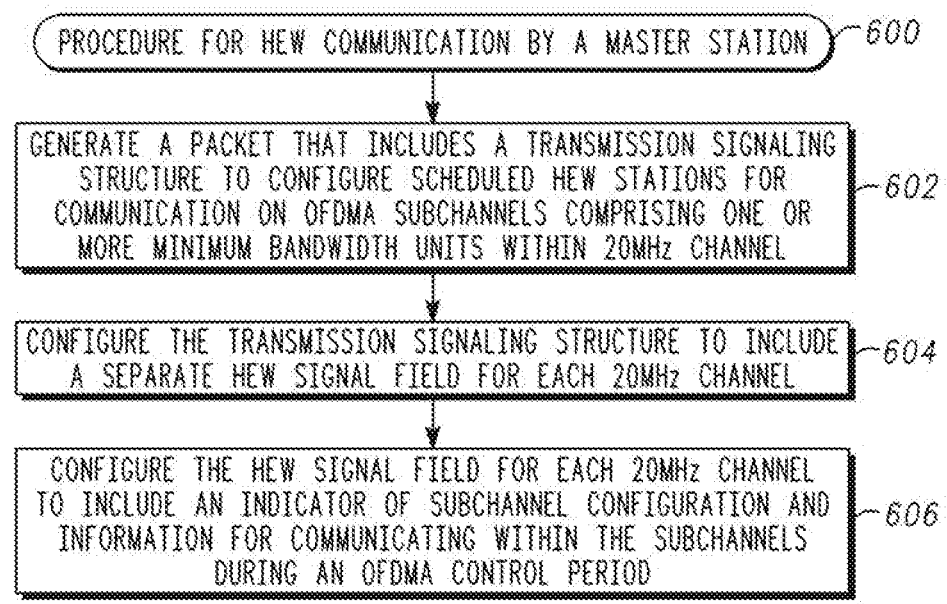

MASTER STATION AND METHOD FOR HEW COMMUNICATION USING A TRANSMISSION SIGNALING STRUCTURE FOR A HEW SIGNAL FIELD

PRIORITY CLAIMS

This application is a continuation of U.S. patent application Ser. No. 14/458,000, filed Aug. 12, 2014, which claims the benefit of priority under 35 U.S.C. 119(e) to the following United States Provisional Patent Applications:

Ser. No. 61/906,059 filed Nov. 19, 2013,
Ser. No. 61/973,376 filed Apr. 1, 2014,
Ser. No. 61/976,951 filed Apr. 8, 2014,
Ser. No. 61/944,194 filed Feb. 25, 2014,
Ser. No. 61/986,256 filed Apr. 30, 2014,
Ser. No. 61/986,250 filed Apr. 30, 2014,
Ser. No. 61/991,730 filed May 12, 2014,
Ser. No. 62/013,869 filed Jun. 18, 2014,
Ser. No. 62/024,813 filed Jul. 15, 2014,
Ser. No. 61/990,414 filed May 8, 2014,
Ser. No. 62/024,801 filed Jul. 15, 2014, and
Ser. No. 62/026,277 filed Jul. 18, 2014, which are all incorporated herein by reference in their entireties.

TECHNICAL FIELD

Embodiments pertain to wireless networks. Some embodiments relate to wireless local area networks (WLANs), Wi-Fi networks and networks operating in accordance with one of the IEEE 802.11 standards, such as the IEEE 802.11ac standard or the IEEE 802.11ax SIG (named DensiFi). Some embodiments relate to high-efficiency wireless or high-efficiency WLAN (HEW) communications.

BACKGROUND

IEEE 802.11ax, referred to as High Efficiency WLAN (HEW), is a successor to IEEE 802.11ac standard and is intended to increase the efficiency of wireless local-area networks (WLANs). HEW's goal is to provide up to four-times or more the throughput of IEEE 802.11ac standard. HEW may be particularly suitable in high-density hotspot and cellular offloading scenarios with many devices competing for the wireless medium may have low to moderate data rate requirements. The Wi-Fi standards have evolved from IEEE 802.11b to IEEE 802.11g/a to IEEE 802.11n to IEEE 802.11ac and now to IEEE 802.11ax. In each evolution of these standards, there were mechanisms to afford coexistence with the previous standard. For HEW, the same requirement exists for coexistence with these legacy standards. One issue with HEW is the efficient allocation and use of bandwidth.

Thus there are general needs for systems and methods that that allow HEW devices to coexist with legacy devices. There are also general needs for systems and methods that that allow HEW devices to coexist with legacy devices and more efficiently allocate and use the available bandwidth.

BRIEF DESCRIPTION OF THE DRAWINGS

FIG. 5 is a function block diagram of an HEW device in accordance with some embodiments;
and
FIG. 6 is a procedure for HEW communication by a master station in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
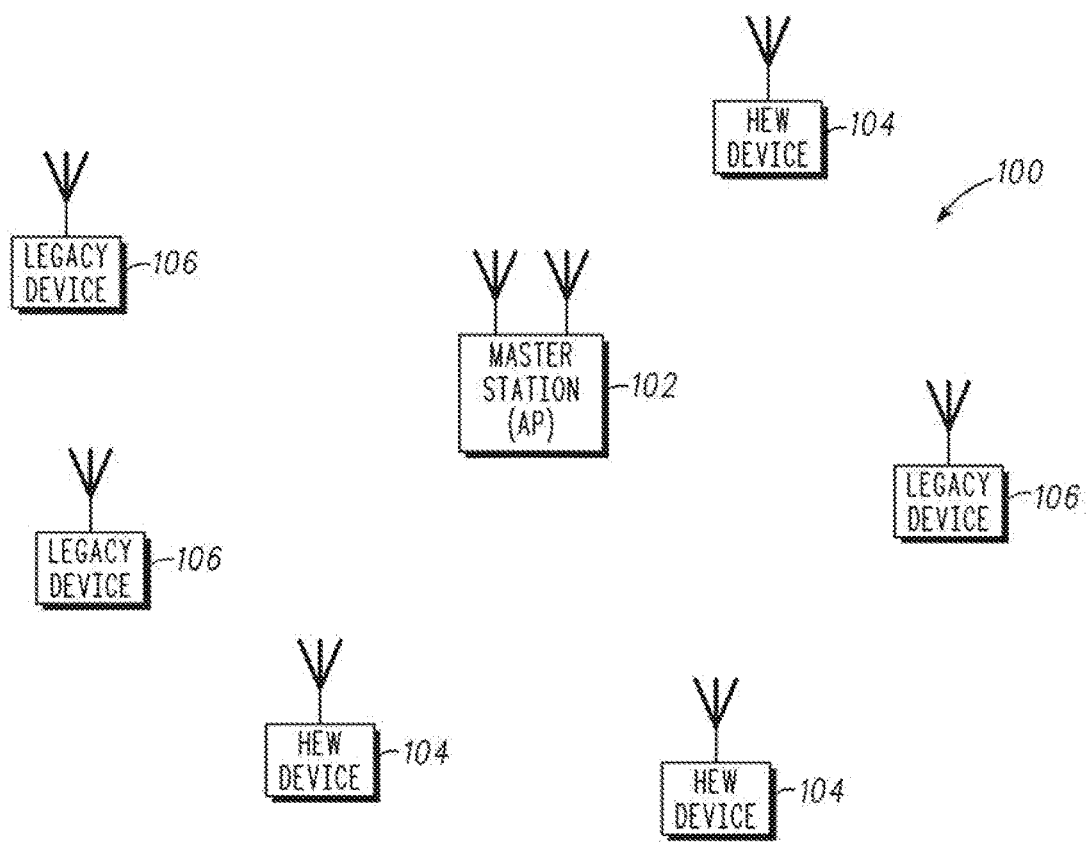
FIG. 1 illustrates an HEW network in accordance with some embodiments.

FIG. 1 illustrates a HEW network in accordance with some embodiments. HEW network 100 may include a master station (STA) 102, a plurality of HEW stations 104 (HEW devices), and a plurality of legacy devices 106 (legacy stations). The master station 102 may be arranged to communicate with the HEW stations 104 and the legacy devices 106 in accordance with one or more of the IEEE 802.11 standards. In accordance with some HEW embodiments, the mater station 102 and HEW stations 104 may communicate in accordance with an IEEE 802.11ax standard. In accordance with some HEW embodiments, the access point 102 may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, scheduled HEW stations 104 may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. Communications during the control period may be either uplink or downlink communications.

The master station 102 may also communicate with legacy stations 106 in accordance with legacy IEEE 802.11 communication techniques. In some embodiments, the master station 102 may also be configurable communicate with HEW stations 104 outside the HEW control period in accordance with legacy IEEE 802.11 communication techniques, although this is not a requirement.

In some embodiments, the data fields of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In these embodiments, each data field of an HEW frame may be configured for transmitting a number of spatial streams. In some embodiments, data fields of an HEW frame may be communicated within OFDMA subchannels having one or more minimum bandwidth units. These embodiments are discussed in more detail below.

In some embodiments, a transmission signaling structure is used to carry packet information (e.g., an HEW frame) to configure devices (e.g., the HEW stations 104) to demodulate a specific portion of the packet and/or to configure devices to transmit or receive using specific OFDMA and MU-MIMO resources. In some embodiments, the specific portion of the packet may comprise one or more minimum bandwidth units of one or more 20 MHz bandwidth structures (e.g., channels). Each 20 MHz bandwidth structure may comprise several minimum bandwidth units to allow each 20 MHz segment to have a have smaller granularity than 20 MHz. Some of the embodiments disclosed herein may provide a signaling design to configure OFDMA receivers in the next generation of Wi-Fi standards, such as High Efficiency WLAN (HEW) (i.e., the IEEE 802.11ax task group), although the scope of the embodiments is not limited in this respect.

Since one main use case for HEW is dense deployments with many devices trying to access the medium with moderate data rates, techniques to allow more simultaneous access devices are needed. The current IEEE 802.11ac specification allows for up to 160 MHz of bandwidth with eight simultaneous multi-input multiple-output (MIMO) streams. The focus for HEW is to use that wide bandwidth to provide access to many devices. Some of the embodiments disclosed herein define a transmission signaling structure that carries packet information to configure an OFDMA receiver and/or to configure the upcoming OFDMA transmission by the devices at the receiving end.

Some embodiments disclosed herein define a transmission signaling structure that is efficient, extensible and decodable by devices that operate in 20 MHz mode which other proposals thus far in DensiFi or IEEE do not provide. In accordance with some embodiments, the transmission structure is configured to carries packet information to configure the OFDMA receivers so that the receivers can demodulate a specific portion of the packet (e.g., specific OFDMA resources and/or MU-MIMO streams) and/or to configure receivers to transmit using specific OFDMA and MU-MIMO resources. The inventive structure may use a minimum of 20 MHz bandwidth and it is modular and extensible to higher bandwidths that are multiples of 20 MHz (e.g., legacy Wi-Fi bandwidths of operation 40, 80 and 160 MHz). Each 20 MHz structure may in turn configure OFDMA subchannels of one or more minimum bandwidth units. These embodiments allow configuring HEW stations 104 to be configured for OFDMA communication in the uplink direction and for OFDMA communication in the downlink direction.

One design target for HEW is to adopt methods to improve the efficiency of Wi-Fi, and specifically the efficiency in dense deployments. Based on this target for HEW, techniques to improve the physical layer (PHY) efficiency such as OFDMA techniques have been proposed. Embodiments disclosed herein provide a new packet structure that may be used in order to configure OFDMA receiver.

Figure 2A:
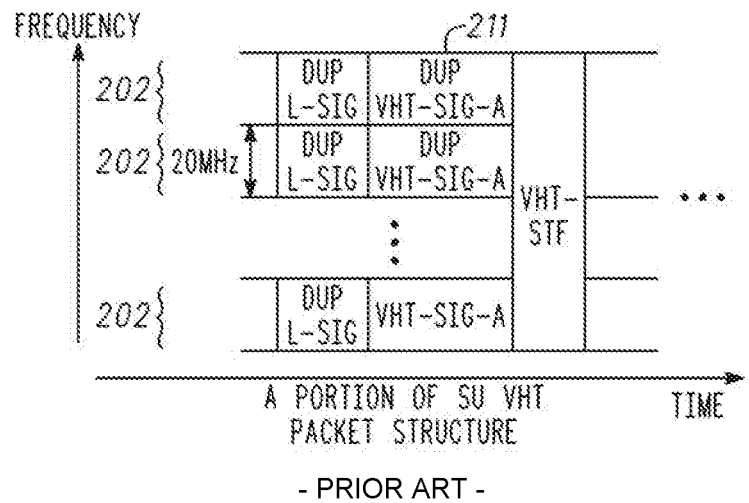
FIG. 2A illustrates a legacy packet structure.

FIG. 2A illustrates a legacy packet structure. In FIG. 2A it can be seen that in IEEE 802.11ac the VHT-SIG-A is duplicated in each 20 MHz channel 202. Additionally the VHT-SIG-A transmission uses an IEEE 802.11a compatible waveform that contains only 48 data subcarriers.

Figure 2B:
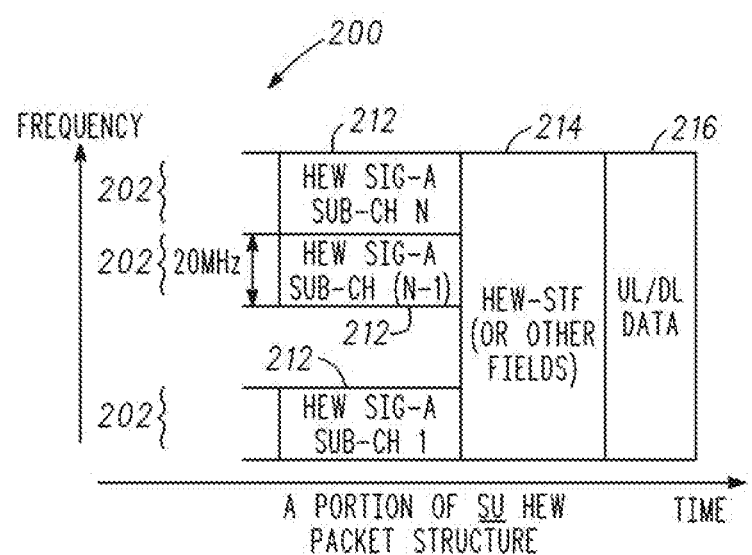
FIG. 2B illustrates an HEW packet structure in accordance with some embodiments.

FIG. 2B illustrates an HEW packet structure in accordance with some embodiments. Embodiments disclosed herein do not duplicate a signal field in each segment and instead transmit independent signal field (e.g., HEW signal field 212) that configures recipient stations in each 20 MHz channel 202. Some embodiments may use fifty-two (52) data subcarriers (e.g., instead of 48) providing more subcarriers to carry signaling information. As illustrated in FIG. 2B, the transmission signaling structure 200 may comprises a separate HEW signal field (HEW-SIG-A) 212 for each of a plurality of 20 MHz channels 202. Each HEW signal field 212 may configure one or more of the scheduled HEW stations 104 for communication on the one or more OFDMA subchannels of an associated one of the 20 MHz channels 202 in accordance with the OFDMA technique. Each 20 MHz channel 202 may be configurable to include one or more fields 214, 216 that follow the HEW signal field 212. In some embodiments, a HEW short training field (HEW-STF) 214 and data field 216 may also be included in the transmission signaling structure 200. These embodiments are described in more detail below.

In accordance with embodiments, the master station 102 may be configured to generate a packet that includes the transmission signaling structure 200 to configure scheduled HEW stations 104 for communication on channel resources in accordance with an OFDMA technique. The channel resources may comprise one or more OFDMA subchannels within a legacy 20 MHz channel 202. Each OFDMA subchannel may comprise one or more minimum bandwidth units having a predetermined bandwidth.

As discussed previously, the HEW OFDMA structure may have smaller granularity than 20 MHz. Therefore, each HEW signal field 212 for either downlink (DL) or uplink (UL) OFDMA scheduling may configure the OFDMA structure within each 20 MHz segment. These embodiments are discussed in more detail below.

Figure 3:
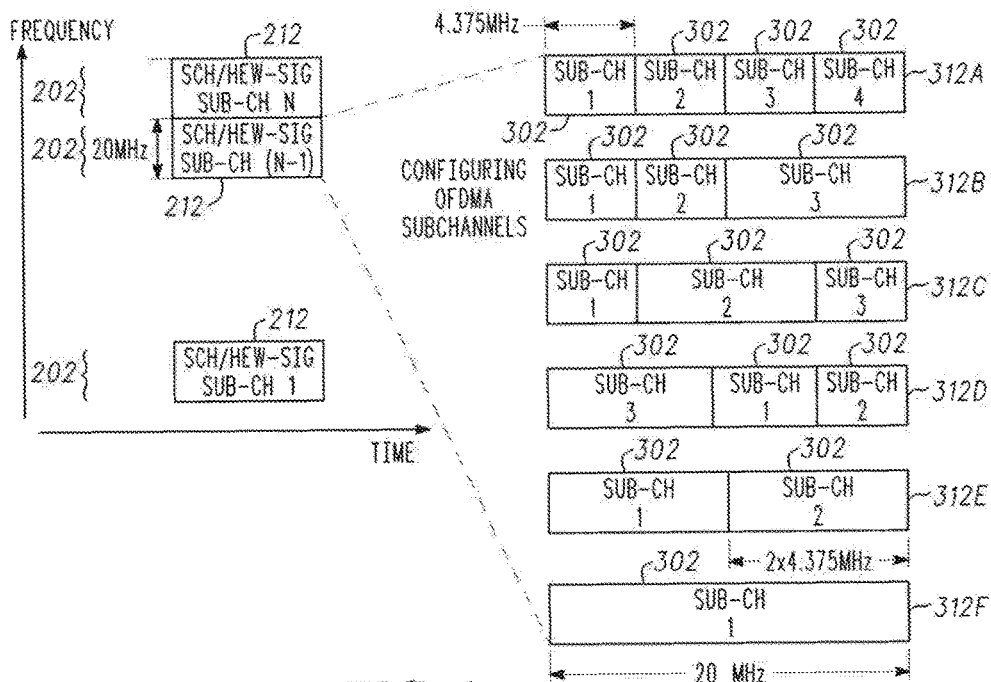
FIG. 3 illustrates an OFDMA subchannel configuration for 20 MHz channels in accordance with some embodiments.

FIG. 3 illustrates an OFDMA subchannel configuration for 20 MHz channels in accordance with some embodiments. FIG. 3 illustrates subchannel configurations 312A, 312B, 312C, 312D, 312E and 312F.

Figure 4:
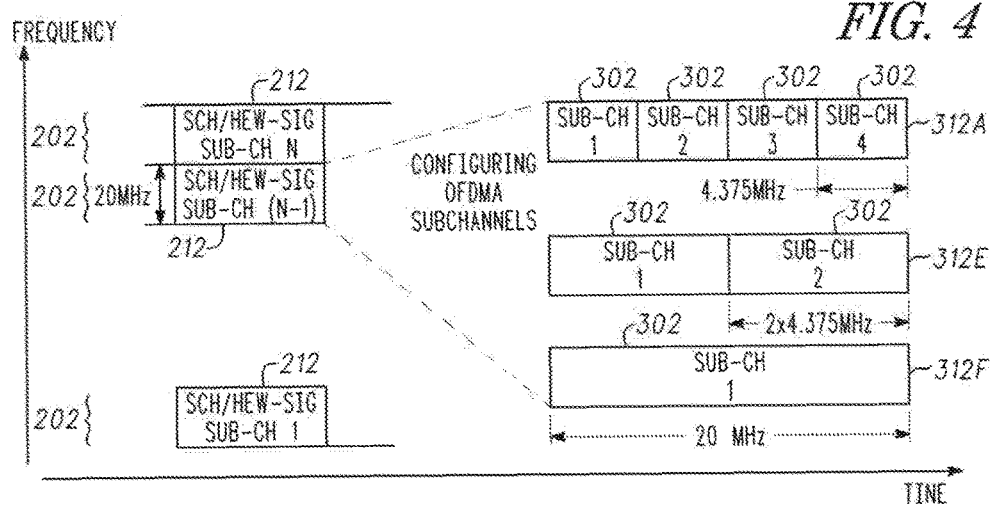
FIG. 4 illustrates a simplified OFDMA subchannel configuration for 20 MHz channels in accordance with some embodiments.

FIG. 4 illustrates a simplified OFDMA subchannel configuration for 20 MHz channels in accordance with some embodiments. FIG. 4 illustrates subchannel configurations 312A, 312E and 312F.

Referring to FIGS. 3 and 4, in accordance with some embodiments, the transmission signaling structure 20 (FIG. 2) may configure scheduled HEW stations 104 (FIG. 1) for communication on channel resources in accordance with an OFDMA technique and the channel resources may comprise one or more OFDMA subchannels 302 within a 20 MHz channel 202. As illustrated in FIGS. 3 and 4, each OFDMA subchannel 302 may comprise one or more minimum bandwidth units having a predetermined bandwidth. In these embodiments, the transmission signaling structure may comprise independent signal fields (e.g., HEW signal fields 212 (FIG. 2)) for each 20 MHz channel to configure HEW stations 104 for OFDMA communications (i.e., either downlink or uplink communications) during an OFDMA control period.

In some embodiments, each minimum bandwidth unit may be 4.75 MHz, for example, and each OFDMA subchannel 302 may comprise up to four minimum bandwidth units, although the scope of the embodiments is not limited in this respect. In some embodiments, each 20 MHz channel 202 may comprise up to four OFDMA subchannels 302, although the scope of the embodiments is not limited in this respect. In these embodiments, the size of the minimum bandwidth unit is fixed which allows while the size of the OFDMA subchannel 302 to vary based on the number of minimum bandwidth units.

As mentioned above, a separate HEW signal field 212 (e.g., HEW-SIG-A) for each of a plurality of 20 MHz channel may be provided and each HEW signal field 212 may configure one or more of the scheduled HEW stations 104 for communication on the one or more OFDMA subchannels 302 of an associated one of the 20 MHz channels 202 in accordance with the OFDMA technique. In these embodiments, the transmission of a separate and possibly different HEW signal field 212 on each 20 MHz channel 202 allows the OFDMA structure for each 20 MHz channel to be individually configured (e.g., a different number of subchannels 302, different communication parameters such as MCS, etc.). These embodiments are discussed in more detail below. In some embodiments, the transmission signaling structure 200 may be a preamble, although the scope of the embodiments is not limited in this respect.

In some embodiments, each HEW signal field 212 may be a 20 MHz transmission on an associated one of the 20 MHz channels 202 and each of the separate HEW signal fields 212 may be configured to be transmitted concurrently on an associated one of the 20 MHz channels 202. Accordingly, different HEW signal fields 212 may be transmitted concurrently on each 20 MHz channel.

In some embodiments, each HEW signal field 212 is arranged to configure scheduled HEW stations 104 for communication on up to four of the OFDMA subchannels 302 within each one of the 20 MHz channels 202. In these example embodiments, each 20 MHz channel 202 may be divided into a maximum of four minimum bandwidth units, each associated with an OFDMA subchannel 302.

In some embodiments, each OFDMA subchannel 302 may comprise between one and four minimum bandwidth units of the predetermined bandwidth within each 20 MHz channel. In these embodiments, since a minimum bandwidth unit has a predetermined bandwidth, the number of minimum bandwidth units within a 20 MHz channel would also be fixed. The number of OFDMA subchannels 302 within a 20 MHz channel 202, however, may vary as each OFDMA subchannel 302 may be configured with a number of minimum bandwidth units (e.g., between one and four).

In some embodiments, the predetermined bandwidth of a minimum bandwidth unit is 4.375 MHz. In some embodiments, the predetermined bandwidth is defined by a predetermined number of subcarriers and predetermined subcarrier spacing. In some embodiments, predetermined number of subcarriers is fourteen (14) and the predetermined subcarrier spacing is 312.5 KHz to provide the predetermined bandwidth of 4.375. In these embodiments, a 64-point FFT may be used.

In some other embodiments, a 256-point FFT may be used. In these other embodiments that use a 256-point FFT, the predetermined number of subcarriers of a minimum bandwidth unit may be 14×4=56 and the predetermined subcarrier spacing may be 312.5/4=78.125 kHz, for example.

In other embodiments (not separately illustrated), each HEW signal field 212 may configure (e.g., carry configuration for) the scheduled HEW stations 104 for communication on up to eight or more of the OFDMA subchannels within each one of the 20 MHz channels 202. In these other embodiments, each 20 MHz channel 202 may be divided into up to eight or more minimum bandwidth units and each minimum bandwidth unit may be less than 4.375 MHz, for example.

In some embodiments, the HEW signal field 212 for each 20 MHz channel may be generated to include an indicator to indicate a subchannel configuration of the associated 20 MHz channel. The subchannel configuration may include at least a number of the minimum bandwidth units. The subchannel configuration may also include information (e.g., communication parameters) for communicating within the OFDMA subchannels 302 during the OFDMA control period including, for example, a modulation and coding scheme (MCS) indicator and length indicator for the minimum bandwidth units. Accordingly, different communication parameters (e.g., MCS) may be used for each 20 MHz channel 202, and in some embodiments, may be used for each OFDMA subchannel 302.

In some embodiments, the indicator in the HEW signal field 212 to indicate the subchannel configuration for each 20 MHz channel may indicates one of a plurality of subchannel configurations (e.g., subchannel configurations 312A, 312B, 312C, 312D, 312E and 213F). In the example illustrated in FIGS. 3 and 4, subchannel configuration 312A may comprise four OFDMA subchannels 302 where each OFDMA subchannel 302 comprises a single minimum bandwidth unit. Subchannel configurations 312B/C/D may comprise three OFDMA subchannels 302 in which two of the OFDMA subchannels 302 comprise a single minimum bandwidth unit and one of the OFDMA subchannels 302 comprises two adjacent minimum bandwidth units. Subchannel configuration 312E may comprise two OFDMA subchannels 302 wherein each OFDMA subchannel 302 comprises two adjacent minimum bandwidth units. Subchannel configuration 312F may comprise a single OFDMA subchannel 302 comprising four adjacent minimum bandwidth units.

For example, the HEW signal field 212 may indicate the use of MCS #1 in a 10 MHz subchannel 302 of subchannel configuration 312E. In some embodiments, the indicator may indicate a particular subchannel configuration (i.e., subchannel configuration 312B, subchannel configuration 312C or subchannel configuration 312D) which may define the location and number of the different subchannels 302 within the channel 202. As illustrated in FIG. 3, for example, each 20 MHz channel 202 may be configured in accordance with any one of a plurality of subchannel configurations (e.g., subchannel configuration 312A, subchannel configuration 312B, subchannel configuration 312C, subchannel configuration 312D, subchannel configuration 312E, or subchannel configuration 312F).

In some embodiments, up to 52 subcarriers (i.e., instead of 48 in the conventional VHT-SIG-A 211 (FIG. 2A)) of a 20 MHz channel may be used for data communication in accordance with the OFDMA technique during the OFDMA control period. These embodiments are discussed in more detail below.

In some embodiments, each 20 MHz channel 202 may be configurable to include one or more fields 214, 216 that follow the HEW signal field 212. In some embodiments, the one of more fields 214, 216 may be configurable to include a minimum of four minimum bandwidth units of 4.375 MHz that are interleaved with null subcarriers in addition to a null subcarrier at DC and further configured to include one or more extra/additional null subcarriers around DC and at band edges to cover a 20 MHz bandwidth of each 20 MHz channel. For example, for data field 216, when the predetermined number of subcarriers of an minimum bandwidth unit is fourteen and the predetermined subcarrier spacing is 312.5 KHz to provide a predetermined bandwidth of 4.375, the 56 subcarriers of the minimum bandwidth units may include at least one pilot subcarrier allowing up to 52 total subcarriers for data, although the scope of the embodiments is not limited in this respect. The HEW-SIG 212, on the other hand, would be transmitted using entire 20 MHz bandwidth using 52 data tones and 4 pilot tones, for example.

In some embodiments, the transmission signaling structure 200 may include an HEW schedule (SCH) field to indicate the particular time and frequency resources of the OFDMA subchannels 302 for each scheduled station 104 for communicating with the master station 102 in accordance with the OFDMA technique during the OFDMA control period. In some embodiments, the HEW schedule field may have independent coding (i.e., may be a separate field) and may follow the HEW signal field 212, although this is not a requirement. In other embodiments, the HEW schedule field may be part of the HEW signal field 212. In some embodiments, the scheduling information may be part of the HEW signal field 212 rather than a separate HEW schedule field, although the scope of the embodiments is not limited in this respect. In some embodiments, the scheduling information may be embedded in a data field, although the scope of the embodiments is not limited in this respect.

In some embodiments, the master station 102 may allocate bandwidth to the scheduled HEW stations 104 based on the minimum bandwidth unit for communication with the master station 102 during an OFDMA control period during which the master station 102 has exclusive control of a wireless medium (i.e., during a TXOP). In these embodiments, the minimum bandwidth units may be configurable to be time and frequency multiplexed during data field 216 (FIG. 2) which may occur within the OFDMA control period. During the control period, packets are either received from the scheduled HEW stations 104 in accordance with an uplink spatial-division multiple access (SDMA) technique using OFDMA, or transmitted to the scheduled HEW stations 104 in accordance with downlink multiplexing technique using OFDMA (i.e., uplink or downlink data during data field 216 (FIG. 2) may be communicated with the scheduled HEW stations).

In some embodiments, the data field 216 may be configured for both downlink and uplink transmissions. In these embodiments, the scheduling information either in HEW SIG 212 or a SCH field may include downlink and uplink scheduling information. In these embodiments, after a downlink transmission by the master station 102 in data field 216, the master station 102 may receive uplink transmissions from the scheduled stations within the data field 216 after a specific inter-frame space (e.g., an SIFS).

In some embodiments, the HEW signal field 212 may also include configuration parameters such as a STBC (1 bit) indicator to indicate if space-time block coding (STBC) is used, a group ID (6 bits) indicator to enable a receiver to determine whether the data payload is single user (SU) or multi user (MU), a number of space-time streams (e.g., 3 bits) indicator to indicate the number of space-time streams, a LDPC extra symbol (e.g., 1 bit) indicator for LDPC coding, a MCS field that contains an MCS index value for the payload, a beamformed (e.g., 1 bit) indicator to indicate when a beamforming matrix is applied to the transmission, a cyclic-redundancy check (CRC) to allow for detect errors in the HEW signal field 212. This is unlike a conventional VHT-SIG-A 211 (FIG. 2A) which requires a bandwidth indicator. In these embodiments, the HEW signal field 212 would not need a bandwidth indicator since the HEW signal field 212 is not duplicated on each 20 MHz channel as is the VHT-SIG-A 211, although the scope of the embodiments is not limited in this respect as a bandwidth indicator may be included to ease receiver implementation.

In some embodiments, these configuration parameters may be used for each different subchannel configuration 312A through 312F. This may result in longer HEW signal field 212 compared to VHT-SIG-A 211 (e.g., for example 6 or 8 OFDMA symbols).

In some alternate embodiments, one or more of the same configuration parameters may be scheduled across all configurations (i.e., subchannel configurations 312A-312F) (e.g., the same STBC or use of LDPC) to reduce overhead of the HEW signal field 212. For example, if the same STBC is to be used for all subchannel configurations, the STBC bit would not need to be repeated for each subchannel configuration but would be sent only once (e.g., in a master-sync transmission) for all minimum bandwidth units. This may allow the HEW signal field 212 to be shorter compared with the conventional VHT-SIG-A 211.

As discussed above, in some embodiments, the one of more fields of the HEW transmission signaling structure 200 may be configurable to include several minimum bandwidth units that are interleaved with null subcarriers (i.e., in addition to a null subcarrier at DC) and may include one or more extra/additional null subcarriers around DC and at band edges to cover a 20 MHz bandwidth of each 20 MHz channel. In some embodiments, the addition of null subcarriers may relax the implementation requirements on synchronization, DC-cancellation, power amplifier and filtering.

In some embodiments, a 20 MHz channel 202 may be configured with two wider subchannels and each subchannel comprises a bandwidth of 2×4.375 MHz minimum bandwidth units. In these embodiments, the waveform transmitted in each 2×4.375 MHz bandwidth may be different than two waveforms transmitted that would be transmitted in each single 4.375 MHz minimum bandwidth unit.

Some embodiments may simplify the design by allowing only a subset of the OFDMA configurations (e.g., the subchannel configurations of FIG. 4 instead of the subchannel configurations of FIG. 3). Such simplification reduces the information needed to configure the receiver and thereby reduces signaling overhead and thus improves on overall system efficiency.

Some embodiments may restrict the number of scheduled HEW stations 104 assigned in each minimum bandwidth unit (e.g., to four multi-user MIMO (MU-MIMO) users). These embodiments may allow the number of spatial streams to be reduced to up to three streams per user. Restricting the number of MU-MIMO users to four may use only two information bits to be carried and restricting number of spatial streams up to three uses another two information bits. These restrictions may further reduce the signaling overhead in the HEW signal field 212, although the scope of the embodiments is not limited in this respect.

Some embodiments disclosed herein provide a modular and extensible OFDMA structure. The basic structure, for example, may configure four minimum bandwidth units or several combinations of the minimum bandwidth unit (e.g., 4.375 MHz and 2×4.375 MHz).

FIG. 5 is a function block diagram of an HEW device in accordance with some embodiments. HEW device 500 may be an HEW compliant device that may be arranged to communicate with one or more other HEW devices, such as HEW stations 104 (FIG. 1) or master station 102 (FIG. 1), as well as communicate with legacy devices. HEW device 500 may be suitable for operating as master station 102 (FIG. 1) or an HEW station 104 (FIG. 1). In accordance with embodiments, HEW device 500 may include, among other things, physical layer (PHY) circuitry 502 and medium-access control layer circuitry (MAC) 504. PHY 502 and MAC 504 may be HEW compliant layers and may also be compliant with one or more legacy IEEE 802.11 standards. PHY 502 and MAC 504 may be arranged to transmit HEW frames in accordance with the structures and techniques disclosed herein. HEW device 500 may also include other processing circuitry 506 and memory 508 configured to perform the various operations described herein.

In accordance with some HEW embodiments, the MAC 504 may be arranged to contend for a wireless medium during a contention period to receive control of the medium for the HEW control period and configure an HEW frame. The PHY 502 may be arranged to transmit a transmission signaling structure within a HEW frame as discussed above. The PHY 502 may also be arranged to communicate with the HEW stations 104 in accordance with an OFDMA technique. MAC 504 may also be arranged to perform transmitting and receiving operations through the PHY 502. The PHY 502 may include circuitry for modulation/demodulation, upconversion/downconversion, filtering, amplification, etc. In some embodiments, the processing circuitry 506 may include one or more processors. In some embodiments, two or more antennas may be coupled to the physical layer circuitry arranged for sending and receiving signals including transmission of the HEW frame. The memory 508 may be store information for configuring the processing circuitry 506 to perform operations for HEW communication and performing the various operations described herein. In some embodiments, the HEW device 500 may comprise one or more radios (e.g., a WLAN radio and a cellular/LTE radio) for communicating with different types of networks.

In some embodiments, the HEW device 500 may be configured to communicate using OFDM communication signals over a multicarrier communication channel. In some embodiments, HEW device 500 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the invention is not limited in this respect as they may also be suitable to transmit and/or receive communications in accordance with other techniques and standards. In some other embodiments, HEW device 500 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW device 500 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW device 500 may include one or more of a keyboard, a display, a non-volatile memory port, multiple antennas, a graphics processor, an application processor, speakers, and other mobile device elements. The display may be an LCD screen including a touch screen.

The antennas of HEW device 500 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 500 may refer to one or more processes operating on one or more processing elements.

In some embodiments, the hardware processing circuitry of an HEW device when operating as an HEW station 104 may be configured to receive an HEW signal field (HEW-SIG-A) on one of a plurality of 20 MHz channels from the master station 102. The HEW signal field may configure the HEW station 104 for communication on the one or more OFDMA subchannels of an associated one of the 20 MHz channels in accordance with an OFDMA technique. The channel resources may comprise one or more OFDMA subchannels within a 20 MHz channel. The HEW station 104 may also be configured to communicate data with the master station 102 the indicated OFDMA subchannel based on configuration information received in the HEW signal field. Each OFDMA subchannel may one or more minimum bandwidth units having a predetermined bandwidth. In these embodiments, the received HEW signal field may include an indicator to indicate a subchannel configuration of the associated 20 MHz channel. The subchannel configuration may include at least a number of the minimum bandwidth units. The received HEW signal field may also include information for communicating within the subchannels during an OFDMA control period including a modulation and coding scheme (MCS) indicator and length indicator for the minimum bandwidth units.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

FIG. 6 is a procedure for HEW communication by a master station in accordance with some embodiments. Procedure 600 may be performed by an access point operating as a master station 102 for communication with a plurality of HEW stations 104.

In operation 602, the master station 102 may generate a packet that includes a transmission signaling structure to configure scheduled HEW stations 104 for communication on channel resources in accordance with an OFDMA technique. The channel resources may comprise one or more OFDMA subchannels within a 20 MHz channel and each OFDMA subchannel may one or more minimum bandwidth units having a predetermined bandwidth.

In operation 604, the transmission signaling structure may be configured to include a separate HEW signal field (e.g., an HEW-SIG-A) for each of a plurality of the 20 MHz channels and each HEW signal field may be arranged to configure one or more of the scheduled HEW stations 104 for communication on the one or more OFDMA subchannels of an associated one of the 20 MHz channels in accordance with the OFDMA technique. Each HEW signal field may be a 20 MHz transmission on an associated one of the 20 MHz channels and each of the separate HEW signal fields may be configured to be transmitted concurrently on an associated one of the 20 MHz channels.

In operation 606, the HEW signal field for each 20 MHz channel may be configured to include an indicator to indicate a subchannel configuration of the associated 20 MHz channel. The subchannel configuration may include at least a number of the minimum bandwidth units. The HEW signal field for each 20 MHz channel may be configured to include information for communicating within the subchannels during an OFDMA control period including a MCS indicator and length indicator for the minimum bandwidth units.

After the HEW signal field is generated in operation 606, the master station 102 transmit the packet that includes the HEW signal field 212 and any other fields (e.g., fields 214 (FIG. 2)) to the scheduled stations 104 for subsequent communication of downlink and/or uplink data in the data field 216 as discussed above.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   memory; and
   processing circuitry coupled to the memory, the processing circuitry configured to:
   encode a high efficiency (HE) packet comprising a HE signal (HE-SIG) field, the HE-SIG field comprising an indicator to indicate, for a 20 MHz bandwidth, a resource unit (RU) arrangement of a plurality of RU arrangements in a frequency domain, the indicator to further indicate a number of multi-user multiple-input multiple-output (MU-MIMO) allocations, the RU arrangement comprising a mix of different RU sizes for the 20 MHz bandwidth, wherein the HE-SIG field is to configure HE stations to receive a data portion of the HE packet, the data portion of the HE packet configured in accordance with the RU arrangement; and
   configure the HE packet for transmission by a wireless device to the HE stations.

2. The apparatus of claim 1, wherein the processing circuitry is further configured to:
   encode a cyclic-redundancy check (CRC) for the HE-SIG field in the HE-SIG field.

3. The apparatus of claim 1, wherein the HE-SIG field further comprises configuration parameters for each RU of the RU arrangement of the plurality of RU arrangements, and wherein the configuration parameters comprise one or more of the following fields: an indication of a modulation and coding scheme (MCS), an indicator if a Low-density parity-check code is to be used, and an indication if beamforming is to be used.

4. The apparatus of claim 1, wherein the processing circuitry is further configured to:
   encode the HE packet to further comprise a second HE-SIG field, the second HE-SIG field comprising a second indicator to indicate, for a second 20 MHz bandwidth, a second RU arrangement, wherein the second 20 MHz bandwidth and the 20 MHz bandwidth are different portions of a 40 MHz bandwidth.

5. The apparatus of claim 4, wherein the processing circuitry is further configured to:
   configure the HE packet for transmission by the wireless device, wherein the HE-SIG field is to be transmitted on the 20 MHz bandwidth and the second HE-SIG field is to be transmitted on the second 20 MHz bandwidth.

6. The apparatus of claim 5, wherein the HE-SIG field further comprises configuration parameters for each RU of the RU arrangement of the plurality of RU arrangements, and wherein the second HE-SIG field further comprises second configuration parameters for each RU of the second RU arrangement, the configuration parameters and the second configuration parameters comprising an indication of a modulation and coding scheme (MCS).

7. The apparatus of claim 6, wherein the processing circuitry is further configured to:
   encode the data portion of the HE packet with data to be encoded in accordance with configuration parameters associated with each RU of the RU arrangement on the 20 MHz bandwidth of the HE packet; and
   encode a second data portion of the HE packet with second data to be encoded in accordance with second configuration parameters associated with each RU of the second RU arrangement on a second 20 MHz bandwidth of the HE packet.

8. The apparatus of claim 1, wherein each of the plurality of RU arrangements indicate a number of RUs and a location of each of the number of RUs.

9. The apparatus of claim 1, wherein the HE-SIG field further comprises configuration parameters for each of the RUs of the RU arrangement and wherein the configuration parameters comprise an indicator to indicate if the RU is a single user (SU) or (MU) RU and a number of space-time streams.

10. The apparatus of claim 1, wherein each of the HE stations and the wireless device is one of the following group:

an Institute of Electrical and Electronic Engineers (IEEE) 802.11 access point, an IEEE 802.11 station, an IEEE 802.11ax access point, and an IEEE 802.11ax station.

11. The apparatus of claim 1, further comprising transceiver circuitry coupled to the processing circuitry.

12. The apparatus of claim 11, further comprising a plurality of antennas coupled to the transceiver circuitry.

13. A method performed by an apparatus, the method comprising:
encoding a high efficiency (HE) packet comprising a HE signal (HE-SIG) field, the HE-SIG field comprising an indicator to indicate, for a 20 MHz bandwidth, a resource unit (RU) arrangement of a plurality of RU arrangements in a frequency domain, the indicator to further indicate a number of multi-user multiple-input multiple-output (MU-MIMO) allocations, the RU arrangement comprising a mix of different RU sizes for the 20 MHz bandwidth, wherein the HE-SIG field is to configure HE stations to receive a data portion of the HE packet, the data portion of the HE packet configured in accordance with the RU arrangement; and
configuring the HE packet for transmission by a wireless device to the HE stations.

14. The method of claim 13, wherein the HE-SIG field further comprises configuration parameters for each RU of the RU arrangement of the plurality of RU arrangements, and wherein the configuration parameters comprise one or more of the following fields: an indication of a modulation and coding scheme (MCS), an indicator if a Low-density parity-check code is to be used, and an indication if beamforming is to be used.

15. A non-transitory computer-readable storage medium that stores instructions for execution by one or more processors, the instructions to configure the one or more processors to cause an apparatus to:
encode a high efficiency (HE) packet comprising a HE signal (HE-SIG) field, the HE-SIG field comprising an indicator to indicate, for a 20 MHz bandwidth, a resource unit (RU) arrangement of a plurality of RU arrangements in a frequency domain, the indicator to further indicate a number of multi-user multiple-input multiple-output (MU-MIMO) allocations, the RU arrangement comprising a mix of different RU sizes for the 20 MHz bandwidth, wherein the HE-SIG field is to configure HE stations to receive a data portion of the HE packet, the data portion of the HE packet configured in accordance with the RU arrangement; and
configure the HE packet for transmission by a wireless device to the HE stations.

16. The non-transitory computer-readable storage medium of claim 15, wherein the instructions are to further configure the one or more processors to cause the apparatus to:
encode the HE packet to further comprise a second HE-SIG field, the second HE-SIG field comprising a second indicator to indicate, for a second 20 MHz bandwidth, a second RU arrangement, wherein the second 20 MHz bandwidth and the 20 MHz bandwidth are different portions of a 40 MHz bandwidth.

17. The non-transitory computer-readable storage medium of claim 16, wherein the instructions are to further configure the one or more processors to cause the apparatus to:
configure the HE packet for transmission by the wireless device, wherein the HE-SIG field is to be transmitted on the 20 MHz bandwidth and the second HE-SIG field is to be transmitted on the second 20 MHz bandwidth.

18. The non-transitory computer-readable storage medium of claim 17, wherein the HE-SIG field further comprises configuration parameters for each RU of the RU arrangement of the plurality of RU arrangements, and wherein the second HE-SIG field further comprises second configuration parameters for each RU of the second RU arrangement, the configuration parameters and the second configuration parameters comprising an indication of a modulation and coding scheme (MCS).

19. The non-transitory computer-readable storage medium of claim 18, wherein the instructions are to further configure the one or more processors to cause the apparatus to:
encode the data portion of the HE packet with data to be encoded in accordance with configuration parameters associated with each RU of the RU arrangement on the 20 MHz bandwidth of the HE packet; and
encode a second data portion of the HE packet with second data to be encoded in accordance with second configuration parameters associated with each RU of the second RU arrangement on a second 20 MHz bandwidth of the HE packet.

20. An apparatus comprising: memory; and processing circuitry coupled to the memory, the processing circuitry configured to:
decode a high efficiency (HE) packet comprising a HE signal (HE-SIG) field, the HE-SIG field comprising an indicator to indicate, for a 20 MHz bandwidth, a resource unit (RU) arrangement of a plurality of RU arrangements in a frequency domain, the indicator to further indicate a number of multi-user multiple-input multiple-output (MU-MIMO) allocations, the RU arrangement comprising a mix of different RU sizes for the 20 MHz bandwidth, wherein the HE-SIG field is to configure HE stations to receive a data portion of the HE packet, the data portion of the HE packet configured in accordance with the RU arrangement; and
decode the data portion in accordance with an RU of the RU arrangement for a HE station of the HE stations.

21. The apparatus of claim 20, wherein the HE-SIG field further comprises configuration parameters for each RU of the second RU arrangement, the configuration parameters comprising an indication of a modulation and coding scheme (MCS).

22. The apparatus of claim 21, wherein the processing circuitry is further configured to:
decode the data portion in accordance with the configuration parameters corresponding to the RU for the HE station.

23. The apparatus of claim 20, wherein the HE station is one of the following group: an Institute of Electrical and Electronic Engineers (IEEE) 802.11 access point, an IEEE 802.11 station, IEEE 802.11ax access point, or an IEEE 802.11ax station.

24. The apparatus of claim 20, further comprising transceiver circuitry coupled to the processing circuitry.

25. The apparatus of claim 24, further comprising a plurality of antennas coupled to the transceiver circuitry.

* * * * *